(12) United States Patent
Xie et al.

(10) Patent No.: US 9,047,441 B2
(45) Date of Patent: Jun. 2, 2015

(54) MALWARE ANALYSIS SYSTEM

(75) Inventors: Huagang Xie, Pleasanton, CA (US);
Xinran Wang, San Ramon, CA (US);
Jiangxia Liu, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 13/115,032

(22) Filed: May 24, 2011

(65) Prior Publication Data

US 2012/0304244 A1 Nov. 29, 2012

(51) Int. Cl.
G06F 17/00 (2006.01)
G06F 21/00 (2013.01)
G06F 21/53 (2013.01)
H04L 29/06 (2006.01)

(52) U.S. Cl.
CPC ............ *G06F 21/00* (2013.01); *G06F 21/53* (2013.01); *H04L 63/0263* (2013.01); *H04L 63/0428* (2013.01); *H04L 63/1408* (2013.01); *H04L 63/145* (2013.01)

(58) Field of Classification Search
CPC ..................................... H04L 63/14
USPC ..................... 726/1, 3, 11, 12, 22, 24, 25
See application file for complete search history.

(56) References Cited

U.S. PATENT DOCUMENTS

| | | | |
|---|---|---|---|
| 5,440,719 A | 8/1995 | Hanes et al. | |
| 6,147,993 A | 11/2000 | Kloth et al. | |
| 6,553,028 B1 | 4/2003 | Tang et al. | |
| 6,728,885 B1 | 4/2004 | Taylor et al. | |
| 6,772,347 B1 | 8/2004 | Xie et al. | |
| 6,912,592 B2 | 6/2005 | Yip | |
| 7,089,294 B1 | 8/2006 | Baskey et al. | |
| 7,093,280 B2 | 8/2006 | Ke et al. | |
| 7,107,612 B1 | 9/2006 | Xie et al. | |
| 7,123,581 B2 | 10/2006 | Sharma et al. | |
| 7,155,572 B2 | 12/2006 | Hughes et al. | |
| 7,177,311 B1 | 2/2007 | Hussain et al. | |
| 7,302,700 B2 | 11/2007 | Mao et al. | |

(Continued)

FOREIGN PATENT DOCUMENTS

FR 2868230 9/2005
JP 2004356983 12/2004

(Continued)

OTHER PUBLICATIONS

Alme et al., McAfee Anti-Malware Engines: Values and Technologies. 2010 http://www.mcafee.com/us/resources/reports/rp-anti-malware-engines.pdf.

(Continued)

*Primary Examiner* — Ashok Patel
*Assistant Examiner* — Gary Gracia
(74) *Attorney, Agent, or Firm* — Van Pelt, Yi & James LLP (57) ABSTRACT

In some embodiments, a malware analysis system includes receiving a potential malware sample from a firewall; analyzing the potential malware sample using a virtual machine to determine if the potential malware sample is malware; and automatically generating a signature if the potential malware sample is determined to be malware. In some embodiments, the potential malware sample does not match a preexisting signature, and the malware is a zero-day attack.

19 Claims, 9 Drawing Sheets

(56) References Cited

U.S. PATENT DOCUMENTS

| | | | |
|---|---|---|---|
| 7,376,125 B1 | 5/2008 | Hussain et al. | |
| 7,486,673 B2 | 2/2009 | Harijono et al. | |
| 7,519,990 B1 | 4/2009 | Xie | |
| 7,580,974 B2 | 8/2009 | Wei et al. | |
| 7,650,634 B2 | 1/2010 | Zuk | |
| 7,734,752 B2 | 6/2010 | Zuk et al. | |
| 7,747,943 B2 | 6/2010 | Bargeron et al. | |
| 7,761,560 B2 | 7/2010 | Ahrndt | |
| 7,779,459 B2 | 8/2010 | Mao et al. | |
| 8,077,723 B2 | 12/2011 | Zuk et al. | |
| 8,151,352 B1 * | 4/2012 | Novitchi | 726/24 |
| 8,176,556 B1 | 5/2012 | Farrokh et al. | |
| 8,185,954 B2 | 5/2012 | Scales | |
| 8,307,351 B2 | 11/2012 | Weigert | |
| 8,402,529 B1 * | 3/2013 | Green et al. | 726/11 |
| 8,566,946 B1 * | 10/2013 | Aziz et al. | 726/25 |
| 8,683,584 B1 * | 3/2014 | Daswani et al. | 726/22 |
| 2001/0027526 A1 | 10/2001 | English et al. | |
| 2002/0026482 A1 | 2/2002 | Morishige et al. | |
| 2002/0118644 A1 * | 8/2002 | Moir | 370/230.1 |
| 2004/0105440 A1 | 6/2004 | Strachan et al. | |
| 2004/0205360 A1 | 10/2004 | Norton et al. | |
| 2005/0021821 A1 * | 1/2005 | Turnbull et al. | 709/232 |
| 2005/0044422 A1 | 2/2005 | Cantrell et al. | |
| 2005/0050171 A1 | 3/2005 | Deerman et al. | |
| 2005/0182950 A1 | 8/2005 | Son et al. | |
| 2005/0190694 A1 | 9/2005 | Ben-Nun et al. | |
| 2005/0203919 A1 | 9/2005 | Deutsch et al. | |
| 2005/0216770 A1 | 9/2005 | Rowett et al. | |
| 2005/0257263 A1 | 11/2005 | Keohane et al. | |
| 2006/0056297 A1 | 3/2006 | Bryson et al. | |
| 2006/0098649 A1 | 5/2006 | Shay | |
| 2006/0137002 A1 | 6/2006 | Forrester | |
| 2006/0227758 A1 | 10/2006 | Rana et al. | |
| 2006/0233100 A1 | 10/2006 | Luft et al. | |
| 2007/0011734 A1 | 1/2007 | Balakrishnan et al. | |
| 2007/0016953 A1 | 1/2007 | Morris et al. | |
| 2007/0056038 A1 | 3/2007 | Lok | |
| 2007/0118350 A1 * | 5/2007 | van der Made | 703/22 |
| 2007/0121615 A1 | 5/2007 | Weill et al. | |
| 2007/0192866 A1 | 8/2007 | Sagoo et al. | |
| 2007/0263241 A1 | 11/2007 | Nakayama | |
| 2007/0289010 A1 | 12/2007 | Thomas et al. | |
| 2007/0297333 A1 | 12/2007 | Zuk et al. | |
| 2008/0005782 A1 * | 1/2008 | Aziz | 726/3 |
| 2008/0016570 A1 * | 1/2008 | Capalik | 726/23 |
| 2008/0025307 A1 | 1/2008 | Preiss et al. | |
| 2008/0133540 A1 * | 6/2008 | Hubbard et al. | 707/10 |
| 2008/0183691 A1 | 7/2008 | Kwok et al. | |
| 2008/0186897 A1 | 8/2008 | Rune et al. | |
| 2008/0196104 A1 | 8/2008 | Tuvell et al. | |
| 2008/0209557 A1 | 8/2008 | Herley et al. | |
| 2008/0222729 A1 * | 9/2008 | Chen et al. | 726/24 |
| 2008/0231885 A1 | 9/2008 | Truong et al. | |
| 2008/0253366 A1 | 10/2008 | Zuk et al. | |
| 2008/0289028 A1 | 11/2008 | Jansen et al. | |
| 2008/0307493 A1 * | 12/2008 | Moghe et al. | 726/1 |
| 2009/0013405 A1 | 1/2009 | Schipka | |
| 2009/0034426 A1 | 2/2009 | Luft et al. | |
| 2009/0064337 A1 | 3/2009 | Chien | |
| 2009/0094697 A1 * | 4/2009 | Provos et al. | 726/23 |
| 2009/0126016 A1 * | 5/2009 | Sobko et al. | 726/23 |
| 2009/0213858 A1 | 8/2009 | Dolganow et al. | |
| 2009/0238071 A1 | 9/2009 | Ray et al. | |
| 2009/0282483 A1 * | 11/2009 | Bennett | 726/23 |
| 2010/0023773 A1 | 1/2010 | Todaka | |
| 2010/0064368 A1 * | 3/2010 | Stolfo et al. | 726/24 |
| 2010/0077476 A1 * | 3/2010 | Adams | 726/22 |
| 2010/0077481 A1 | 3/2010 | Polyakov et al. | |
| 2010/0115621 A1 * | 5/2010 | Staniford et al. | 726/25 |
| 2010/0146615 A1 * | 6/2010 | Locasto et al. | 726/11 |
| 2010/0217801 A1 * | 8/2010 | Leighton et al. | 709/203 |
| 2010/0218253 A1 | 8/2010 | Sutton et al. | |
| 2011/0035804 A1 * | 2/2011 | Moghe | 726/26 |
| 2011/0041179 A1 | 2/2011 | St. Hlberg | |
| 2011/0078794 A1 * | 3/2011 | Manni et al. | 726/23 |
| 2011/0099633 A1 * | 4/2011 | Aziz | 726/24 |
| 2011/0209038 A1 | 8/2011 | Travieso et al. | |
| 2011/0219448 A1 * | 9/2011 | Sreedharan et al. | 726/23 |
| 2011/0247072 A1 * | 10/2011 | Staniford et al. | 726/24 |
| 2011/0276699 A1 * | 11/2011 | Pedersen | 709/227 |
| 2011/0321160 A1 | 12/2011 | Mohandas et al. | |
| 2012/0023112 A1 | 1/2012 | Levow et al. | |
| 2012/0054866 A1 * | 3/2012 | Evans et al. | 726/23 |
| 2012/0180132 A1 * | 7/2012 | Wu | 726/24 |
| 2012/0222121 A1 | 8/2012 | Staniford et al. | |
| 2013/0212404 A1 | 8/2013 | Pravetz et al. | |

FOREIGN PATENT DOCUMENTS

| | | |
|---|---|---|
| JP | 2005229573 | 8/2005 |
| JP | 2008011537 | 1/2008 |
| WO | 2007120165 | 10/2007 |
| WO | 2008002930 | 1/2008 |
| WO | 2008128085 | 10/2008 |

OTHER PUBLICATIONS

Attig et al., "A Framework for Rule Processing in Reconfigurable Network Systems", Proceedings of the 13th Annual IEEE Symposium on Field-Programmable Custom Computing Machines (FCCM '05).

Cisco Systems, Inc., "Optimizing Application Traffic with Cisco Service Control Technology", 2008.

Cisco Systems, Inc., "Policy-Based Routing" 1996.

Cisco Systems, Inc., "Cisco Sce Service Control Engine", 2008.

EP Search Report for EP 07012529.9 dated Nov. 7, 2007.

Examination Report for EP 07012529.9 dated Sep. 8, 2009.

International Preliminary Report on Patentability for PCT/US208/60089 dated Oct. 13, 2009.

International Search Report and Written Opinion for PCT/US08/60089 dated Jul. 23, 2008.

M. Roesch, "SNORT—Lightweight Instruction Detection for Networks", Proceedings of LISA'99: 13th Systems Administration Conference, Nov. 7-12, 1999, pp. 229-238.

Notice of Reasons of Rejection for JP 2007168277 dated Dec. 15, 2009.

Bloce et al., "Portable document format (pdf) security analysis and malware threats." Presentations of Europe BlackHat Conf. Amsterdam. 2008.

* cited by examiner

MALWARE ANALYSIS SYSTEM

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purposes devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices, such as computer servers, gateways, network/routing devices (e.g., network routers), or data appliances (e.g., security appliances or other types of special purposes devices).

Firewalls typically deny or permit network transmission based on a set of rules. These sets of rules are often referred to as policies. For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein). Firewalls can also be capable of performing basic routing functions.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using Hyper Text Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering, as discussed above. Next generation firewalls can also perform additional firewall techniques. For example, certain newer firewalls, sometimes referred to as advanced or next generation firewalls, can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provide higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency).

Current firewalls typically enforce based on signatures and/or heuristics. As a result, in order to detect malware, a firewall generally must have existing signatures or existing heuristics (e.g., a predefined signature and/or a predefined heuristic) that can detect the malware.

However, a zero-day attack, also sometimes referred to as a zero-hour attack or day zero attack, is a malware threat or attack that attempts to exploit vulnerabilities (e.g., in an operating-system, application software, security software, and/or other aspects of a computing/network platform) that are new and/or previously unidentified or unknown to others or the software developer. Zero-day exploits generally refer to software that exploits a security hold to carry out an attack. Zero-day exploits are used or shared by hackers or attackers before the developer of the target software/platform is aware of the vulnerability and/or prior to the target software/platform provider providing a fix to the vulnerability (e.g., distributing an update to patch the security hole) and/or prior to security providers providing an update that can detect the malware (e.g., distributing a signature and/or a heuristic that can detect the attack(s) attempting to exploit the vulnerability).

Various approaches to address zero-day exploits exist but each have different shortcomings. For example, vulnerability assessment software attempts to identify vulnerabilities in software platforms and/or applications. However, vulnerability assessment techniques cannot identify all potential new vulnerabilities. As another example, white listing techniques (e.g., implemented by firewalls and/or intrusion detection/prevention systems) can limit access based on known good applications. However, such an approach can be severely restrictive and some known good applications can later be discovered to have vulnerabilities that were not previously identified during testing or by vulnerability assessment techniques. White listing combined with black listing techniques (e.g., using signature-based techniques to block known bad applications, or applications with known vulnerabilities) can also be used to limit access to known good and/or prevent access to known bad applications. However, this approach suffers from the similar shortcomings of the above-described approaches and, for example, can similarly be very restrictive for users and network/computing environments. Other current approaches can potentially determine that a host has been infected (e.g., downloaded a malicious file) and to quarantine the infected host, but such approaches fail to prevent the infection of that host and such approaches generally cannot prevent future infections of other hosts by the same malicious file.

What is needed to further protect devices communicating on networks is a malware analysis system for detecting malware for which existing signatures do not detect (e.g., which can then effectively prevent new zero-day exploits). Accordingly, a malware analysis system is disclosed. In particular, a malware analysis, using the various techniques described herein can provide zero-day protection, is provided, which protects against zero-day exploits by detecting new malware threats for which preexisting signatures do not exist and automatically generating new signatures in real-time for the new malware threats. For example, a virtual machine (VM) can be used to perform behavior profiling (e.g., in a VM sandbox environment) using various heurist based analysis techniques that can be performed in real-time during a file transfer (e.g., during a file download), and if the file being downloaded is determined to be malicious, then the firewall can automatically block the file download based on the analysis result, and a new signature can be generated and distributed to automatically block future file transfer requests to download the file determined to be malicious. In some embodiments, various heuristic techniques are performed by the malware analysis system using a VM to emulate the behavior of a file (e.g., which can include executable code, such as JavaScript), web site content, and/or other behavior to analyze a potential malware sample. For example, the VM emulation of accessing a particular web site and downloading certain content from the web site can indicate certain suspicious behavior, such as changes to certain platform, software, or registry settings. Various other heuristic-based analysis techniques for malware analysis using a VM environment are described herein with respect to various embodiments.

In some embodiments, a malware analysis system includes receiving a potential malware sample from a firewall; analyzing the potential malware sample using a virtual machine to determine if the potential malware sample is malware; and automatically generating a signature (e.g., a hash-based signature for a file and/or other types of signatures as described herein) if the potential malware sample is determined to be malware. In some embodiments, the signature is distributed to a plurality of network devices/functions (e.g., routers and gateways) and/or security devices/functions (e.g., security/ firewall appliances, security/firewall gateways, host-based firewalls, host-based security suites, and security cloud services). In some embodiments, the potential malware sample does not match a preexisting signature. In some embodiments, the potential malware sample does not match a preexisting signature and the malware is a zero-day attack.

In some embodiments, the firewall is executed on a first device, and the virtual machine is executed by a second device. In some embodiments, the firewall is implemented by a security appliance (e.g., a firewall appliance), and the virtual machine is implemented by a virtual machine (VM) appliance. In some embodiments, the firewall is a host-based firewall executed on a first device, and the virtual machine is implemented by a virtual machine appliance. In some embodiments, the virtual machine is implemented by a security cloud service. In some embodiments, the firewall decrypts a network traffic flow to generate the potential malware sample for analysis using the virtual machine.

In some embodiments, a malware analysis system further includes sending the signature to the firewall, in which the firewall includes the signature in one or more firewall policies. In some embodiments, a malware analysis system further includes sending the signature to the firewall, in which the firewall is implemented in a gateway security device, a security appliance, a network routing device, or a general purpose computer executing a host-based firewall. In some embodiments, a malware analysis system further includes sending the signature to a cloud security service.

In some embodiments, a malware analysis system further includes monitoring behavior of the potential malware sample during emulation using the virtual machine to identify malware. For example, various heuristic-based techniques as described herein can be used to determine that a potential malware sample is or should be determined to be malware (e.g., using URL, DNS, a protocol, and/or file or other information or activities or behavior profiling techniques).

In some embodiments, a malware analysis system further includes sending log information related to the potential malware to the virtual machine. For example, the log information can include session information, application identification information, URL category information, and/or vulnerability alert information. In some embodiments, the virtual machine performs post analysis using the log information to determine if the potential malware is malware.

In some embodiments, a malware analysis system includes monitoring a plurality of network traffic flows; decrypting an encrypted network traffic flow to generate a potential malware sample, in which a preexisting signature does not match the potential malware sample; sending the potential malware sample to a malware analysis device, in which the malware analysis device executes a virtual machine to analyze the potential malware sample using the virtual machine to determine if the potential malware sample is malware; receiving results of the analysis of the potential malware sample from the malware analysis device; automatically generating a signature if the potential malware sample is determined to be malware; and enforcing a security policy for network access based on the signature.

In some embodiments, a malware analysis system includes analyzing a potential malware sample using a virtual machine to determine if the potential malware sample is malware, in which a signature does not exist for the potential malware sample; automatically generating a signature if the potential malware sample is determined to be malware; adding a firewall rule that is based on the signature; and enforcing the firewall rule using the signature.

Figure 1:
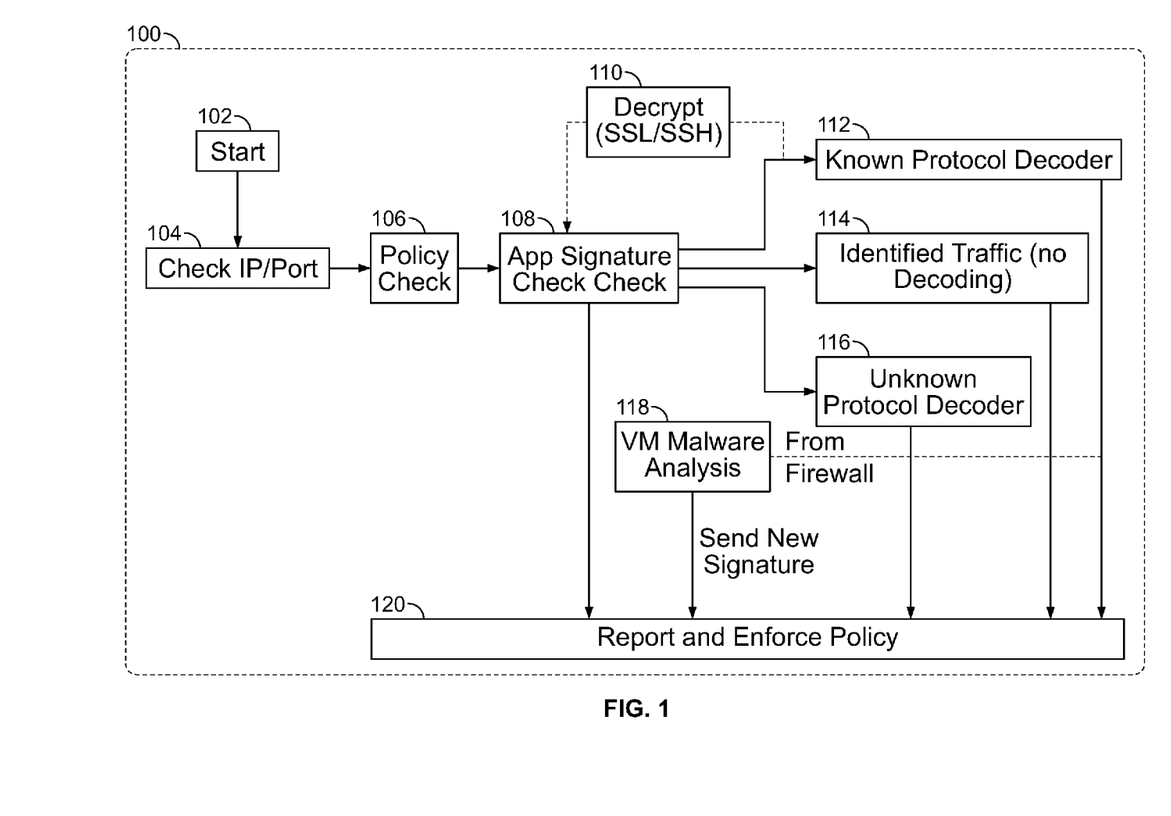
FIG. 1 is a functional diagram for a malware analysis system in accordance with some embodiments.

FIG. 1 is a functional diagram for a malware analysis system in accordance with some embodiments. As shown in FIG. 1, network traffic is monitored at a firewall 100. In some embodiments, network traffic is monitored using a data appliance (e.g., a data appliance that includes security functions, such as a security appliance that includes a firewall). In some embodiments, network traffic is monitored using a gateway (e.g., a gateway that includes security functions, such as a security gateway). In some embodiments, network traffic is monitored using a host (e.g., security software executed on a host device, such as a network server or client computing device, such as a personal computer, laptop, tablet, or smart phone). In some embodiments, the network traffic is monitored using in-line monitoring techniques. In some embodiments, the network traffic is collected and/or monitored (e.g., some of the network traffic can be monitored using in-line monitoring techniques and/or some of the network traffic can be collected and analyzed for monitoring the network traffic offline, such as in logs of network traffic).

In some embodiments, network traffic is monitored using a state-based firewall. In some embodiments, the state-based firewall can monitor traffic flows using APP-ID engine (e.g., App Signature Check 108). For example, the monitored network traffic can include HTTP traffic, FTP traffic, DNS requests, unclassified application traffic (e.g., unknown application traffic), and/or other types of traffic (e.g., traffic using other types of known or unknown protocols).

As shown in FIG. 1, network traffic monitoring begins at 102. An IP address and port engine 104 determines an IP address and port number for a monitored traffic flow (e.g., a session) based on packet analysis. In some embodiments, user identification is then determined (e.g., user ID can be deduced based on the source IP address). A policy check engine 106 determines whether any policies can be applied based on the IP address and port number. An application signature check engine 108 identifies an application (e.g., using an APP-ID engine using various application signatures for identifying applications based on packet flow analysis). For example, APP-ID engine 108 can be configured to determine what type of traffic the session involves, such as HTTP traffic, FTP traffic, DNS requests, unknown traffic, and various other types of traffic, and such classified traffic can be directed to an appropriate decoder, such as decoders 112, 114, and 116, to decode the classified traffic for each monitored session's traffic flow. If the monitored traffic is encrypted (e.g., encrypted using SSL, SSH, or another known encryption protocol), then the monitored traffic can be decrypted using a decrypt engine 110 (e.g., applying man in the middle techniques using a self-signed certificate). A known protocol decoder engine 112 decodes and analyzes traffic flows using known protocols (e.g., applying various signatures for the known protocol) and reports the monitored traffic analysis to a report and enforce policy engine 120. Identified traffic (no decoding required) engine 114 reports the identified traffic to the report and enforce policy engine 120. An unknown protocol decoder engine 116 decodes and analyzes traffic flows (e.g., applying various heuristics) and reports the monitored traffic analysis to the report and enforce policy engine 120.

In some embodiments, the results of the various traffic monitoring techniques using known protocol decoder engine 112, identified traffic engine 114, and unknown protocol decoder engine 116 described above are provided to report and enforce policies engine 120 (e.g., network/routing policies, security policies, and/or firewall policies). For example, firewall policies can be applied to the monitored network traffic using application identification, user identification, and/or other information to match preexisting signatures (e.g., file-based, protocol-based, and/or other types/forms of signatures for detecting malware or suspicious behavior).

As also shown in FIG. 1, a VM malware analysis engine 118 receives potential malware samples from the firewall. In some embodiments, the results of the various traffic monitoring techniques using known protocol decoder engine 112, identified traffic engine 114, and unknown protocol decoder engine 116 described above are provided to report and enforce policies engine 120 (e.g., network/routing policies, security policies, and/or firewall policies) do not match any preexisting signatures. In some embodiments, if no preexisting signatures are matched, a potential malware sample can be selected for further analysis and forwarded to the VM malware analysis engine for performing the further analysis (e.g., for real-time behavior profiling analysis using virtual machines to provide a sandbox environment to detect malware and/or for post analysis using log information as described herein with respect to various embodiments) to determine whether the potential malware sample is malware. In some embodiments, various rules/policies are applied for determining whether such potential malware samples should be provided to the virtual machine engine for further analysis, and such rules/policies can be based on geography (e.g., source country/geography of content), based on a URL category, based on a file type (e.g., PDF or another file type), a file size (e.g., file sizes forwarded for real-time VM emulation analysis can be limited to a maximum size, such as 1 GB, or another file size, to avoid too large of a file to emulate in real-time using VM techniques), obfuscated JavaScript (e.g., very long variables, long variables that include packed code using eval function, and/or other obfuscation techniques), and/or various other rules/policies for selection potentially suspicious malware appropriate for real-time VM emulation malware analysis.

In some embodiments, if the potential malware sample is determined to be malware, then a new signature is generated using various techniques described herein. In some embodiments, the new signature is generated by another device or another function. For example, the firewall can generate the new signature.

In some embodiments, firewall 100 also includes a content-ID engine (not shown), and, in some embodiments, the content-ID engine's identified content is also used by report and enforce policy engine 120, possibly in various combinations with other information, such as application, user, and/or other information, to enforce various security/firewall policies/rules.

In some embodiments, various other functional architectures and flows are provided to implement the policy enforcement using host information profile techniques described herein. For example, some of these functions can be implemented in software executed on a general processor and/or some of these functions can be implemented using hardware acceleration techniques for faster packet processing of network traffic.

Figure 2:
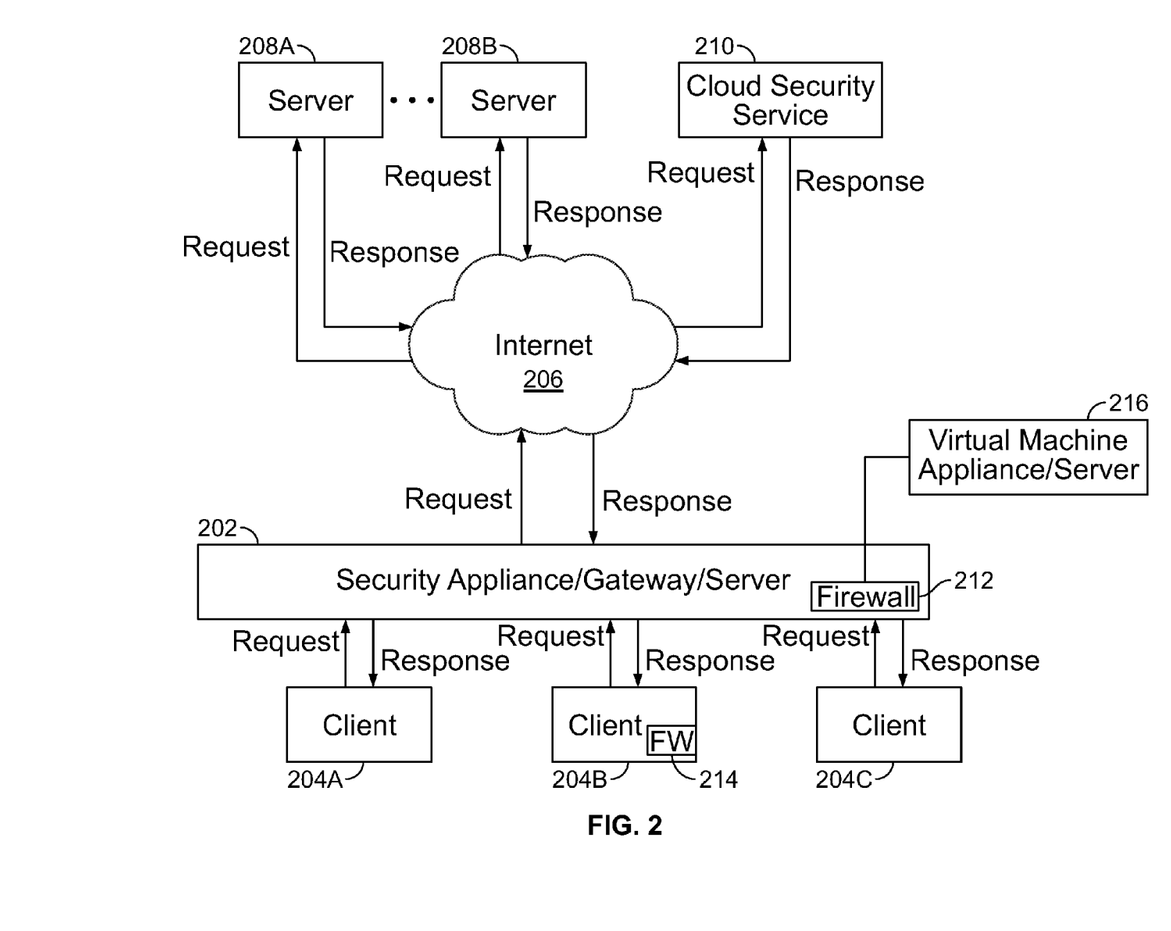
FIG. 2 is a block diagram illustrating an architecture for a malware analysis system in accordance with some embodiments.

FIG. 2 is a block diagram illustrating an architecture for a malware analysis system in accordance with some embodiments. As shown in FIG. 2, client devices 204A, 204B, and 204C are in communication with the Internet 206 via a security device 202. In some embodiments, the security device 202 includes a firewall 212 as shown. In some embodiments, one or more of the client devices 204A-204C includes a firewall 214 (e.g., host-based firewall), as shown. In some embodiments, the security device 202 includes a data appliance (e.g., a security appliance), a gateway (e.g., a security server), a server (e.g., a server that executes security software including firewall 212), and/or some other security device, which, for example, can be implemented using computing hardware, software, or various combinations thereof. In some embodiments, firewall 212 and/or firewall 214 perform some or all of the functions described above with respect to FIG. 1. For example, client devices 204A-C can include various computing devices that can access the Internet via wired and/or wireless communications, such as computers, laptops, tablets, smart phones, and/or various other types of computing devices with network communication capabilities. As also shown, servers 208A and 208B are in communication with the Internet. For example, a client device can access a service provided by a server via the Internet, such as a web related service (e.g., web site, cloud-based services, streaming services, or email service), peer-to-peer related service (e.g., file sharing), IRC service (e.g., chat service), and/or any other service that can be delivered via the Internet.

As also shown in FIG. 2, a Virtual Machine (VM) appliance/server 216 is provided. For example, VM appliance/server 216 can include VMware® or XEN® virtual machine/virtualization software (e.g., executing Microsoft Windows® or the monitored client device OS as a guest host) and any required/recommended hardware and other software/platform requirements for proper performance or high performance. For example, the hardware requirements are generally higher for computing requirements for executing virtual machine/virtualization software, and thus, by providing the VM function on another dedicated appliance or server, the other security appliances/devices do not require such hardware and, thus, can be provided using lower cost hardware. VM appliance/server 216 is in communication with the firewall 212. For example, the firewall 212 can send potential malware samples for which no preexisting signatures match to the VM appliance/server 216 for further analysis using the techniques described herein. If the potential malware sample is determined to be malware, then the VM appliance server 216 (e.g., or another function/device) can automatically generate a new signature for the malware, which can then be sent to the firewall 212 for updating the signature/data and/or rules/policies of the firewall 212 so that the malware can be detected and appropriate actions taken by the firewall 212, such as to block the malware. Thus, using these techniques, even zero-day attacks can be detected and blocked. In some embodiments, the virtual machine appliance/server 216 is in communication with one or more of the client devices (e.g., firewall 214 of client 204B) and/or the security cloud service 210, and possibly other/functions.

In some embodiments, the VM appliance/server 216 is implemented on or integrated into the security appliance/gateway/server 202. In some embodiments, the VM appliance/server 216 is implemented on or integrated into the security cloud service 210.

For example, the security device 202 (e.g., an integrated security appliance/gateway/server) can communicate with security cloud service 210 (e.g., using secure communications, such as encrypted communication techniques) to receive security related content updates (e.g., signatures, heuristics, application ID related information, user ID related information, content ID related information, trusted/untrusted zone information, and/or policy/rules). As another example, the security device 202 (e.g., an integrated security appliance/gateway/server) can communicate with security cloud service 210 (e.g., using secure communications, such as encrypted communication techniques) to provide the monitored traffic information (e.g., potential malware samples, such as in the form of subsets of such monitored traffic information, such as a portion of the packet flow, monitored URL/DNS information, monitored files requested for upload/download/access, and/or other information, along with possibly other information, such as content information for the client device associated with the traffic flow and possibly user identification and/or application identification information as well), and the security cloud service 210 can perform additional real-time and or post analysis (e.g., additional heuristic analysis as described herein with respect to various embodiments for detecting malware, including new malware threats and zero-day attacks, and/or to compare to other samples received and analyzed for other customers of the security cloud service). As will now be apparent, some or all of the functions described above with respect to FIG. 1 can be assisted by or implemented in whole or in part by the security cloud service. The security cloud service can allow for reducing the processing on the client device (e.g., 204B), security device 202, and/or VM appliance/server 216 by performing some of these functions. The security cloud service can also provide additional heuristic-based analysis and/or use additional information by having received many more network traffic flows of information (e.g., including network traffic behaviors and/or URLs) and can aggregate such information to provide for more information for certain application traffic flows and/or URLs that may not (yet) be known by the security device 202 (e.g., for which signatures do not yet exist).

In some embodiments, new signatures automatically generated using the various techniques described herein are distributed to various other security functions/devices and/or services, such as host-based firewalls, security appliances, network devices, and/or security cloud services. In some embodiments, the virtual machine (VM) function for detecting malware for which preexisting signatures do not exist is integrated into a security appliance, firewall appliance, network/data appliance and/or executed on host device, such as a security server, network server or gateway, and/or client device (e.g., a personal computer, laptop, tablet, and/or other general purpose client device with sufficient processor and memory for executing a virtual machine). In some embodiments, the VM function for detecting malware for which preexisting signatures do not exist is provided be the security cloud service. In some embodiments, host devices, such as the client devices and/or services, such as gateways or security servers, provide the potential malware samples to the VM function/device.

Figure 3:
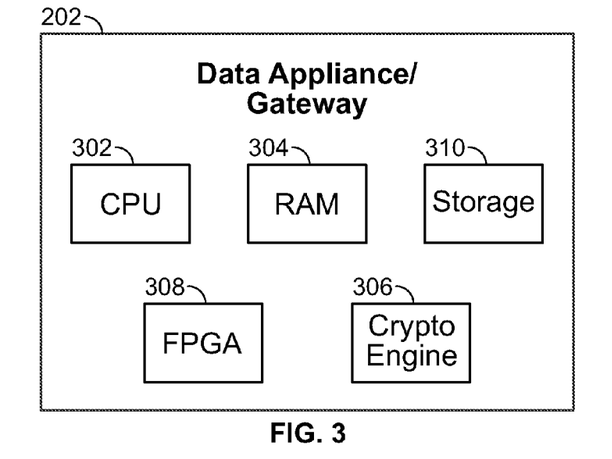
FIG. 3 is a functional diagram of hardware components of a data appliance for a malware analysis system in accordance with some embodiments.

FIG. 3 is a functional diagram of hardware components of a data appliance for a malware analysis system in accordance with some embodiments. The example shown is a representation of physical components that can be included in data appliance 202 (e.g., a data appliance or gateway). Specifically, data appliance 202 includes a high performance multi-core CPU 302 and RAM 304. Data appliance 202 also includes a storage 310 (e.g., one or more hard disks or solid state storage units), which is used to store policy and other configuration information as well as preexisting signatures. Data appliance 202 can also include one or more optional hardware accelerators. For example, data appliance 202 can include a cryptographic engine 306 configured to perform encryption and decryption operations, and one or more FPGAs 308 configured to perform signature matching, act as network processors, and/or perform other tasks.

Figure 4:
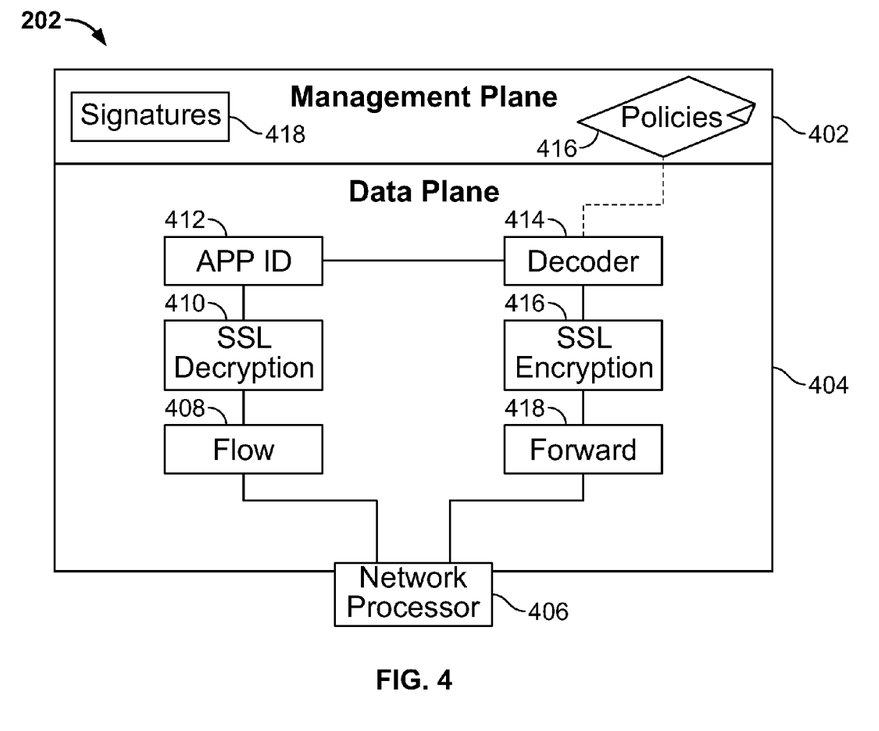
FIG. 4 is a functional diagram of logical components of a data appliance for a malware analysis system in accordance with some embodiments.

FIG. 4 is a functional diagram of logical components of a data appliance for a malware analysis system in accordance with some embodiments. The example shown is a representation of logical components that can be included in data appliance 202. As shown, data appliance 202 includes a management plane 403 and a data plane 404. In some embodiments, the management plane is responsible for managing user interactions, such as by providing a user interface for configuring policies and viewing log data. The data plane is responsible for managing data, such as by performing packet processing and session handling.

Suppose a client 204A attempts to access a server 208B using an encrypted session protocol, such as SSL. Network processor 406 is configured to receive packets from client 204A, and provide the packets to data plane 404 for processing. Flow 408 identifies the packets as being part of a new session and creates a new session flow. Subsequent packets will be identified as belonging to the session based on a flow lookup. If applicable, SSL decryption is applied by SSL decrypter 410. Otherwise, processing by SSL decrypter 410 is omitted. Application identification module 412 is configured to determine what type of traffic the session involves and to identify a user associated with the traffic flow. For example, application identification module 412 can recognize a GET request in the received data and conclude that the session requires an HTTP decoder. For each type of protocol, there exists a corresponding decoder 414. In some embodiments, the application identification is performed by an application identification module (e.g., APP-ID engine), and a user identification is performed by another function/engine. Based on the determination made by application identification module 412, the packets are sent to an appropriate decoder 414. Decoder 414 is configured to assemble packets (e.g., which may be received out of order) into the correct order, perform tokenization, and extract out information. Decoder 414 also performs signature matching to determine what should happen to the packet. As also shown, signatures 418 are received and stored in the management plane 402. In some embodiments, policy enforcement (e.g., policies can include one or more rules, and rules can apply one or more signatures) using signatures is applied as described herein with respect to various embodiments based on the monitored, identified, and decoded session traffic flows. In some embodiments, decoder 414 can also enforce policies 416 using signatures 418 provided by management plane 402, including newly generated signatures, using the various techniques described herein with respect to various embodiments.

Figure 5:
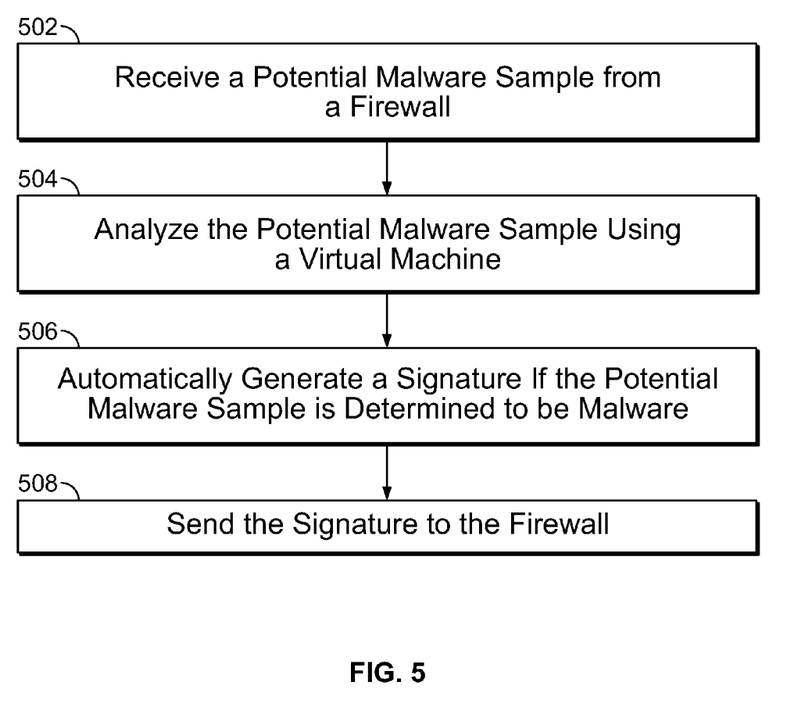
FIG. 5 is a flow diagram for a malware analysis system in accordance with some embodiments.

FIG. 5 is a flow diagram for a malware analysis system in accordance with some embodiments. At 502, a potential malware sample is received from a firewall (e.g., or another inline security or network device/function, such as a network router or an IDS/IPS function/device). At 504, the potential malware sample is analyzed using a virtual machine.

At 506, a new signature is automatically generated if the potential malware sample is determined to be malware. In some embodiments, a new signature is a new file-based signature (e.g., an MD5 hash-based signature for identifying a malware file, a digest from header information of a file based on a file type for identifying a malware file, or heuristic-based file signature generation techniques based on an analysis of, for example, a PDF file that includes JavaScript that is suspicious or recently added header references appending new data in the PDF file). In some embodiments, a new signature is a DNS-based signature, a URL-based signature, an IP-based signature, a protocol-based signature, a port-based signature, and/or other types of signatures, or combinations thereof, that can be effectively applied and enforced using inline network security (e.g., filtering or firewall) techniques. For example, a new signature can be generated for a PDF file that is determined to include malicious content. The PDF file can be de-obfuscated, if appropriate, and parsed. If the PDF file is detected to include script (e.g., JavaScript), it is scanned using a malicious script detection engine for malicious JavaScript elements. In some cases, a signature can be generated using patterns identified within one or more script portions of the PDF file. If a signature was not generated using patterns identified within one or more script portions of the PDF file and/or there is no script included in the PDF file, then a signature can be generated using portions of the PDF file related to a cross-reference table of the PDF file. The generated signatures can then be used to detect whether subsequently received PDF files include malware.

At 508, the new signature is sent to the firewall. In some embodiments, the new signature is distributed to other security functions/devices and/or a security cloud service.

Figure 6:
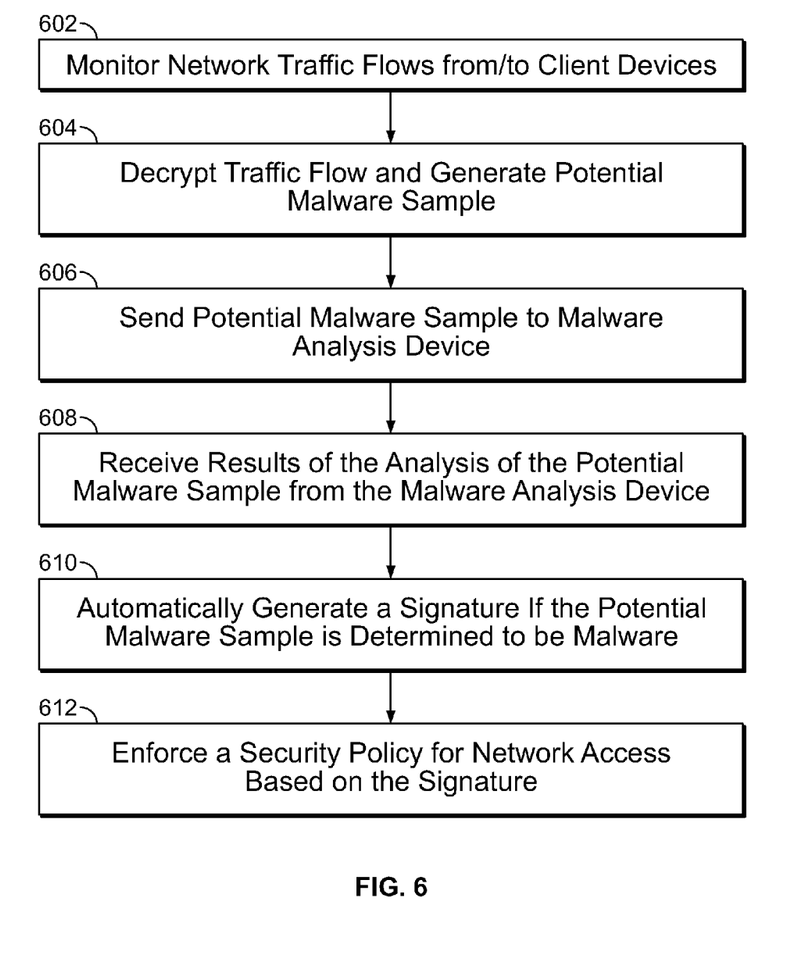
FIG. 6 is another flow diagram for a malware analysis system in accordance with some embodiments.

FIG. 6 is another flow diagram for a malware analysis system in accordance with some embodiments. At 602, network traffic flows from/to client devices are monitored. At 604, an encrypted network traffic flow is decrypted and, if a preexisting signature does not match, a potential malware sample is generated. At 606, the potential malware sample is sent to a malware analysis device (e.g., a Virtual Machine (VM) appliance or a server that executes VMs for behavior profile analysis, as described herein using various techniques for malware analysis and detection). At 608, results of the analysis of the potential malware sample are received from the malware analysis system. At 610, a new signature is automatically generated if the potential malware sample is determined to be malware. At 612, a security policy is enforced for network access/control based on the new signature (e.g., a security policy can include various firewall rules or other network access/control rules that can use/apply the new signature).

Figure 7:
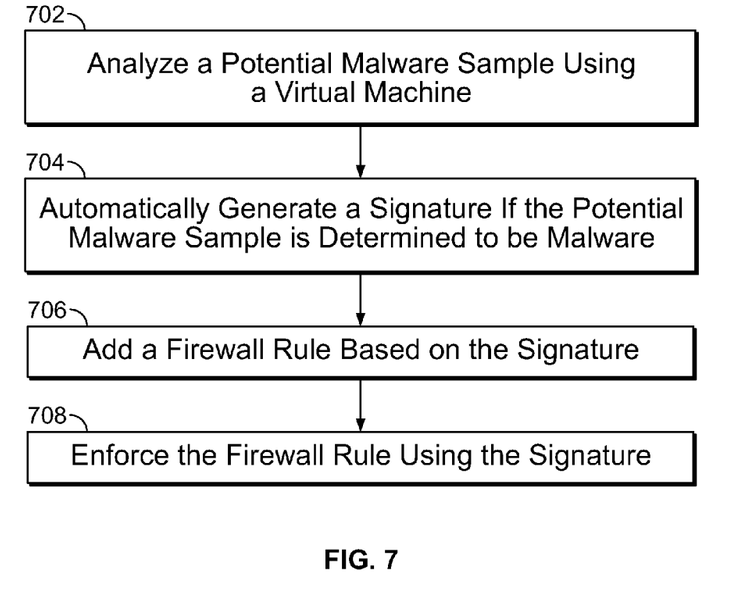
FIG. 7 is another flow diagram for a malware analysis system in accordance with some embodiments.

FIG. 7 is another flow diagram for a malware analysis system in accordance with some embodiments. At 702, a potential malware sample is analyzed using a virtual machine (e.g., executed by a security/firewall appliance/device/server). At 704, a new signature is automatically generated if the potential malware sample is determined to be malware. At 706, a new firewall rule is added, in which the new firewall rule is based on or uses the new signature. At 708, the new firewall rule is enforced using the new signature.

In embodiments, various heuristic techniques are performed by the malware analysis system using a VM to emulate the behavior of a file or web site content and/or other behavior to analyze the potential malware sample in a controlled/secure sandbox environment of a VM environment. For example, behavior profiling techniques for identifying potentially suspicious behavior often associated with malware can include programmatically making changes to security application/platform settings (e.g., changes to a Windows Filtering Platform (WFP) setting, changes to an Internet Explorer (IE) browser setting, changes to an auto start registry, and/or changes to an install driver). Various other heuristic techniques for malware analysis and identification are discussed below with respect to FIGS. 8, 9, and 10.

Figure 8:
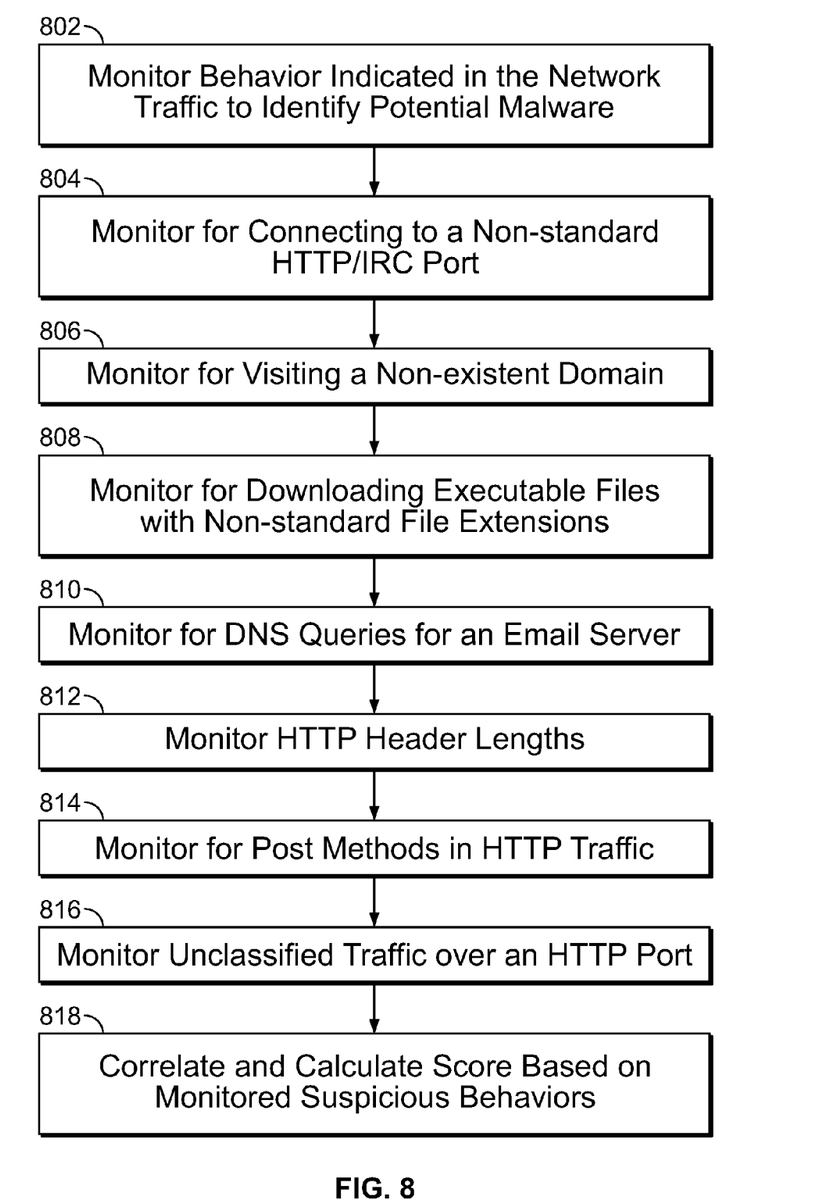
FIG. 8 is another flow diagram for a malware analysis system in accordance with some embodiments.

FIG. 8 is another flow diagram for a malware analysis system in accordance with some embodiments. At 802, monitoring behavior indicated in the network traffic to identify malware or potential malware is performed (e.g., using a VM to emulate and/or monitor the behavior of a potential malware sample). At 804, monitoring behavior indicated in the network traffic for connecting to a non-standard HTTP port for HTTP traffic is performed (e.g., using a port other than port 80 for HTTP traffic). At 806, monitoring behavior indicated in the network traffic for visiting a non-existent domain is performed. At 808, monitoring behavior indicated in the network traffic for downloading executable files with non-standard executable file extensions is performed (e.g., executable files with file extensions that are different from a common ".exe" file extension). At 810, monitoring behavior indicated in the network traffic for performing a DNS query for an email server is performed. At 812, monitoring behavior indicated in the network traffic for communicating using HTTP header with a shorter than common length is performed. For example, a threshold can be set at three HTTP header fields, which can be triggered by the following example in which there are only two HTTP header fields "User-agent" and "host":

```
GET/xin.rar HTTP/1.1
User-Agent: RookIE/1.0
Host: www.wc86.com
```

At 814, monitoring behavior indicated in the network traffic for communicating using a post method in HTTP traffic is performed. At 816, monitoring behavior indicated in the network traffic for communicating unclassified traffic (e.g., unknown application traffic) over an HTTP port is performed. In some embodiments, various other heuristics can be performed for network traffic behavior monitoring for identifying potential malware. For example, network traffic can be monitored to identify the behavior of connecting to a non-standard IRC port for IRC traffic (e.g., IRC protocol traffic using port 80, which is typically only used by HTTP protocol traffic). As another example, monitoring behavior indicated in the network traffic for communicating using intrusion prevention system evasion techniques is also performed. As an example, in an HTTP post request, assume a string "POST" is sent through three IP packets. The first packet is a single character "P", the second is duplicated "P", and the third one is "ost". This technique would evade any firewall/IPS functions that do not reassemble TCP packets, but using the techniques described herein, which includes reassembly of TCP packets, this type of behavior can be detected. At 818, correlating the monitored and classified network traffic behaviors is performed, and a score (e.g., a severity score or malware score) is calculated based on the monitored/classified suspicious behaviors.

Figure 9:
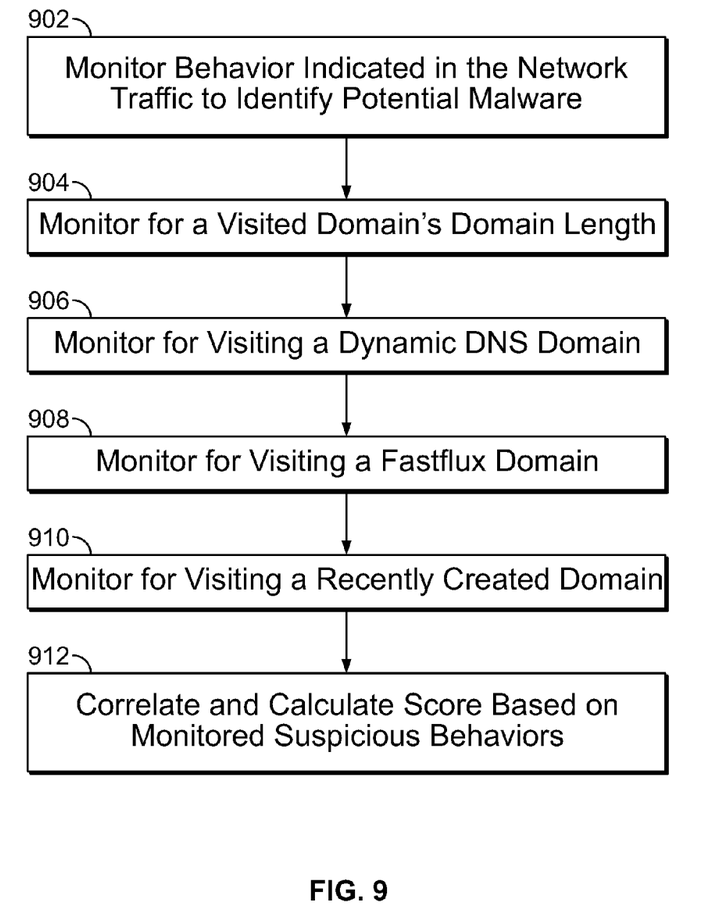
FIG. 9 is another flow diagram for a malware analysis system in accordance with some embodiments.

FIG. 9 is another flow diagram for a malware analysis system in accordance with some embodiments. At 902, monitoring behavior indicated in the network traffic to identify malware is performed (e.g., using a VM to emulate and/or monitor the behavior of a potential malware sample). At 904, monitoring behavior indicated in the network traffic for visiting a domain with a domain name that is longer than a common domain name length is performed (e.g., a known malware visits domain 2.0.0.805.784286832.1595022578.128.4096.014a0d3f846-ea4af889dd9d8bc8aa80bc65807eadd2dbb27f1.twothousands.com, in which the threshold length is 90). At 906, monitoring behavior indicated in the network traffic for visiting a dynamic DNS domain is performed. At 908, monitoring behavior indicated in the network traffic for visiting a fast-flux domain is performed. At 910, monitoring behavior indicated in the network traffic for visiting a recently created domain is performed. At 912, correlating the monitored and classified network traffic behaviors is performed, and a score (e.g., a severity score or malware score) is calculated based on the monitored/classified suspicious behaviors.

Figure 10:
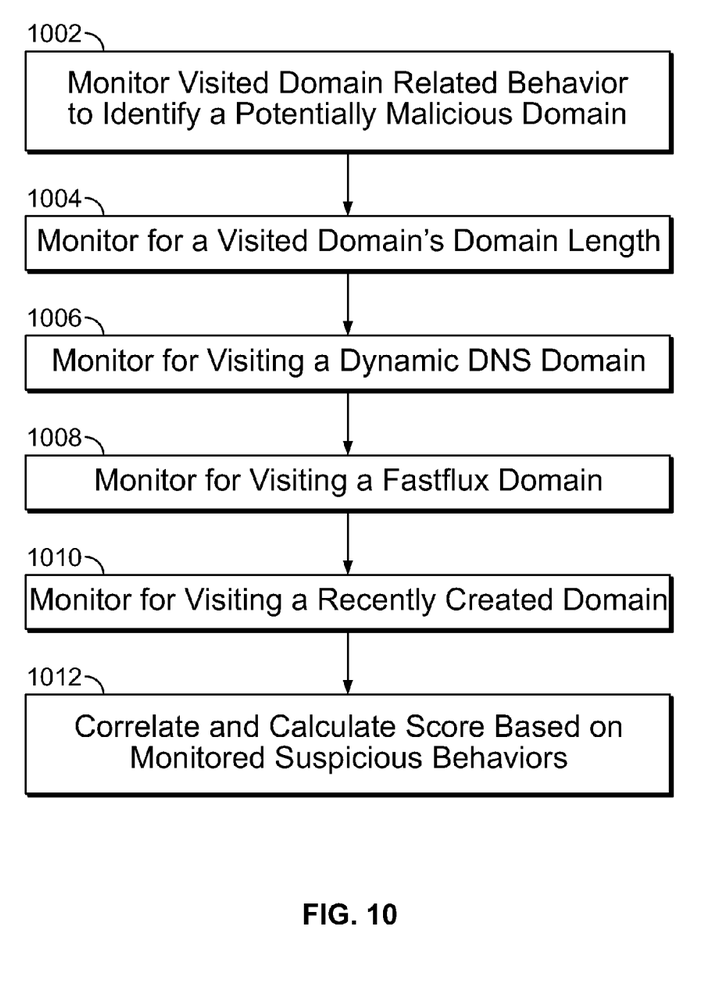
FIG. 10 is another flow diagram for a malware analysis system in accordance with some embodiments.

FIG. 10 is another flow diagram for a malware analysis system in accordance with some embodiments. At 1002, monitoring visited domain related behavior to identify a malicious domain is performed (e.g., using a VM to emulate and/or monitor the behavior of a potential malware sample). At 1004, monitoring visited domain related behavior for a domain name length of a visited domain is performed. At 1006, monitoring visited domain related behavior for whether a visited domain is a dynamic DNS domain is performed. At 1008, monitoring visited domain related behavior for whether a visited domain is a fast-flux domain is performed. At 1010, monitoring visited domain related behavior for whether a visited domain is a recently created domain is performed. At 1012, correlating the monitored and classified network traffic behaviors is performed, and a score (e.g., a severity score or malware score) is calculated based on the monitored/classified suspicious behaviors.

As will now be apparent, various other heuristic-based malware detection techniques can be applied using the malware analysis system in accordance with various embodiments described herein. Also, various system and network architectures can be applied using the various techniques described herein. For example, various techniques for malware analysis as described herein can be implemented in an integrated security appliance that provides inline filtering functionality and also executes the virtual machine analysis techniques as described herein. As another example, the virtual machine functionality can be implemented using another appliance or computer server, which can communicate the malware analysis results (e.g., a new signature and/or malware analysis results that facilitate another function to generate the new signature) to various other security functions (e.g., security appliances, network appliances, and/or host-based security software). As yet another example, the virtual machine functionality can be implemented using or assisted by a security cloud service (e.g., for performing certain post analysis techniques using log information as described herein), which can communicate the malware analysis results (e.g., a new signature and/or malware analysis results that facilitate another function to generate the new signature) to various other security functions (e.g., security appliances, network appliances, and/or host-based security software) and/or generates new security updates (e.g., pushes the new signature(s) to various security devices/software that subscribe to signature updates from the security cloud service vendor).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a first device comprising a first processor configured to execute a firewall, and a second device comprising a second processor configured to execute a virtual machine, wherein the executing the firewall using the first processor of the first device comprises:
using the firewall to identify an application type associated with a network traffic flow;
using the firewall to select a decoder to decode the network traffic flow based at least in part on the identified application type, wherein decoding the network traffic flow includes assembling one or more packets associated with the network traffic flow into a correct order;
using the firewall to decrypt the network traffic flow to generate a potential malware sample from at least a portion of the network traffic flow, wherein a preexisting signature does not match the potential malware sample, wherein the potential malware sample is related to a Portable Document Format (PDF) file; and
sending the potential malware sample from the firewall to the virtual machine; and
wherein the executing the virtual machine using the second processor of the second device comprises:
analyzing the potential malware sample using the virtual machine to determine if the potential malware sample is malware, wherein analyzing the potential malware using the virtual machine includes monitoring behavior of the potential malware sample during emulation using the virtual machine to identify malware, wherein the monitored behaviors that indicate potential malware include one or more of the following: visiting a domain associated with a domain name length that exceeds a threshold, and communicating using an HTTP header associated with a shorter than threshold length;
determining a score associated with one or more network traffic behaviors associated with the potential malware sample monitored using the virtual machine;
automatically generating a signature using the virtual machine if the potential malware sample is determined to be malware, wherein the determination of whether the potential malware sample comprises malware is based at least in part on the score, wherein the signature in the event that the potential malware sample is determined to be malware is generated based at least in part on at least a cross reference table included in the PDF file; and
sending the signature from the virtual machine to the firewall, wherein the firewall is configured to enforce a security policy for network access based at least in part on the signature.

2. The system recited in claim 1, wherein the potential malware sample does not match the preexisting signature, and the malware is a zero-day attack.

3. The system recited in claim 1, wherein the first device associated with the firewall comprises a security appliance, and the second device associated with the virtual machine comprises a virtual machine appliance.

4. The system recited in claim 1, wherein the firewall is a host-based firewall executed on the first device, and the second device associated with the virtual machine comprises a virtual machine appliance.

5. The system recited in claim 1, wherein the second device associated with the virtual machine comprises a security cloud service.

6. The system recited in claim 1, wherein the firewall is configured to enforce the signature includes the firewall being configured to add the signature to one or more firewall policies.

7. The system recited in claim 1, wherein the first device associated with the firewall comprises a gateway security device, a security appliance, a network routing device, or a general purpose computer executing a host-based firewall.

8. The system recited in claim 1, wherein the executing the virtual machine using the second processor of the second device further comprises:
sending the signature to a cloud security service.

9. The system recited in claim 1, wherein the executing the virtual machine using the second processor of the second device further comprises:
monitoring behavior of the potential malware sample during emulation using the virtual machine to identify malware based on heuristics.

10. The system recited in claim 1, wherein the executing the virtual machine using the second processor of the second device further comprises:
monitoring behavior of the potential malware sample during emulation using the virtual machine to identify malware, wherein the monitored behaviors that indicate potential malware include one or more of the following:

visiting a non-existent domain, downloading executable files with non-standard executable file extensions, performing a DNS query for an email server, communicating using a post method in HTTP traffic, connecting to a non-standard IRC port for IRC traffic, communicating using intrusion prevention system evasion techniques, and communicating unclassified traffic over an HTTP port.

11. The system recited in claim 1, wherein the executing the virtual machine using the second processor of the second device further comprises:
monitoring behavior of the potential malware sample during emulation using the virtual machine to identify malware, wherein the monitored behaviors that indicate potential malware include one or more of the following: visiting a dynamic DNS domain, visiting a fast-flux domain, and visiting a recently created domain.

12. The system recited in claim 1, wherein the executing the virtual machine using the second processor of the second device further comprises:
monitoring behavior of the potential malware sample during emulation using the virtual machine to identify a malicious domain, wherein the monitored visited domain related behavior indicates a potentially malicious domain based on one or more of the following: whether a visited domain is a dynamic DNS domain, whether a visited domain is a fast-flux domain, and whether a visited domain is a recently created domain.

13. The system recited in claim 1,
wherein automatically generating the signature comprises generating a file-based signature using a hash function or a digest of file header information.

14. The system recited in claim 1, wherein the executing the firewall using the first processor of the first device further comprises:
sending log information related to the potential malware to the virtual machine, wherein the log information includes one or more of the following: session information, the identified application type, URL category information, and vulnerability alert information.

15. The system of claim 1, wherein the executing the firewall using the first processor of the first device further comprises:
sending log information related to the potential malware to the virtual machine, wherein the virtual machine performs post analysis using the log information to determine if the potential malware sample is malware, wherein the log information includes the identified application type associated with the network traffic flow.

16. A method, comprising:
using a firewall to identify an application type associated with a network traffic flow;
using the firewall to select a decoder to decode the network traffic flow based at least in part on the identified application type, wherein decoding the network traffic flow includes assembling one or more packets associated with the network traffic flow into a correct order;
using the firewall, executed by a first device, to decrypt the network traffic flow to generate a potential malware sample from at least a portion of the network traffic flow, wherein a preexisting signature does not match the potential malware sample, wherein the potential malware sample is related to a Portable Document Format (PDF) file;
sending the potential malware sample from the firewall to a virtual machine, executed by a second device;
analyzing the potential malware sample using the virtual machine to determine if the potential malware sample is malware, wherein analyzing the potential malware using the virtual machine includes monitoring behavior of the potential malware sample during emulation using the virtual machine to identify malware, wherein the monitored behaviors that indicate potential malware include one or more of the following: visiting a domain associated with a domain name length that exceeds a threshold, and communicating using an HTTP header associated with a shorter than threshold length;
determining a score associated with one or more network traffic behaviors associated with the potential malware sample monitored using the virtual machine;
automatically generating a signature using the virtual machine if the potential malware sample is determined to be malware, wherein the determination of whether the potential malware sample comprises malware is based at least in part on the score, wherein the signature if the potential malware sample is determined to be malware is generated based at least in part on a cross reference table included in the PDF file; and
sending the signature from the virtual machine to the firewall, wherein the firewall is configured to enforce a security policy for network access based at least in part on the signature.

17. The method recited in claim 16, further comprising:
monitoring behavior of the potential malware sample during emulation using the virtual machine to identify malware based on heuristics.

18. A computer program product, the computer program product being embodied in a non-transitory computer readable storage medium and comprising computer instructions for:
using a firewall to identify an application type associated with a network traffic flow;
using the firewall to select a decoder to decode the network traffic flow based at least in part on the identified application type, wherein decoding the network traffic flow includes assembling one or more packets associated with the network traffic flow into a correct order;
using the firewall, executed by a first device, to decrypt the network traffic flow to generate a potential malware sample from at least a portion of the network traffic flow, wherein a preexisting signature does not match the potential malware sample, wherein the potential malware sample is related to a Portable Document Format (PDF) file;
sending the potential malware sample from the firewall to a virtual machine, executed by a second device;
analyzing the potential malware sample using the virtual machine to determine if the potential malware sample is malware, wherein analyzing the potential malware using the virtual machine includes monitoring behavior of the potential malware sample during emulation using the virtual machine to identify malware, wherein the monitored behaviors that indicate potential malware include one or more of the following: connecting to a non-standard HTTP port for HTTP traffic, visiting a domain associated with a domain name length that exceeds a threshold, and communicating using an HTTP header associated with a shorter than threshold length;
determining a score associated with one or more network traffic behaviors associated with the potential malware sample monitored using the virtual machine;
automatically generating a signature using the virtual machine if the potential malware sample is determined to be malware, wherein the determination of whether the potential malware sample comprises malware is based at least in part on the score, wherein the signature if the potential malware sample is determined to be malware is generated based at least in part on at least one of a script or a cross reference table included in the PDF file; and sending the signature from the virtual machine to the firewall, wherein the firewall is configured to enforce a security policy for network access based at least in part on the signature.

19. The computer program product recited in claim 18, further comprising computer instructions for:

monitoring behavior of the potential malware sample during emulation using the virtual machine to identify malware based on heuristics.

* * * * *